United States Patent
Walker

[11] Patent Number: 5,192,105
[45] Date of Patent: Mar. 9, 1993

[54] POLE HANDLER

[76] Inventor: G. Glenn Walker, 113 Greenbriar Rd., Gadsden, Ala. 35901

[21] Appl. No.: 826,852

[22] Filed: Jan. 28, 1992

[51] Int. Cl.$^5$ .............................................. B25J 1/02
[52] U.S. Cl. ........................................ 294/19.1; 81/64; 294/15
[58] Field of Search ......................... 294/4, 15–18, 294/19.1, 22, 23, 26, 31.2, 103.1, 117, 119.2; 81/3.8, 53.1–53.12, 64, 65, 177.6–177.85, 487, 489, 491; 254/121, 129, 131, 133 R; 403/53, 57, 58; 414/23

[56] References Cited

U.S. PATENT DOCUMENTS

| 528,994 | 11/1894 | Smith . | |
|---|---|---|---|
| 787,805 | 4/1905 | Thompson | 81/53.12 |
| 951,341 | 3/1910 | Shelton et al. | 294/17 |
| 1,174,950 | 3/1916 | Sedgwick . | |
| 1,805,381 | 5/1931 | Shimko | 294/17 X |
| 1,978,590 | 10/1934 | McNaught et al. | 81/177.75 X |
| 2,201,394 | 5/1940 | Edelblute | 81/64 U X |
| 2,379,433 | 7/1945 | Hemmerling | 294/19.1 X |
| 2,522,190 | 9/1950 | Mouser | 81/65 |
| 3,262,585 | 7/1966 | Olson | 294/19.1 X |
| 3,888,534 | 6/1975 | Hall et al. | 294/19.1 |
| 4,075,913 | 2/1978 | Tye | 294/19.1 X |
| 4,212,577 | 7/1980 | Swanson | 414/23 |
| 4,838,465 | 6/1989 | Metzger | 294/16 X |
| 4,848,818 | 7/1989 | Smith | 294/19.1 |
| 4,913,010 | 4/1990 | Doss | 81/64 |

OTHER PUBLICATIONS

Hastings Fiber Glass Products, Inc.: Pole Cant Tool, copyright 1987.

Primary Examiner—Johnny D. Cherry

[57] ABSTRACT

A manual pole handling tool which comprises an insulating fiberglass rod handle that is attached to a chain load binder by means of a handle sleeve and a swivel component. One end of the sleeve receives the fiberglass handle and the sleeve's opposite end is pivotally connected at one end of the swivel so that the handle can rotate at least 180 degrees in the swivel. A bolt or other pin member connects the swivel's opposite end to the load binder so that the swivel can rotate 360 degrees around the pin member. When the load binder is tightened around the pole, the swivel will permit the rod handle to rotate right, left, up or down so that pulling or pushing forces can be applied to the pole in various directions.

16 Claims, 1 Drawing Sheet

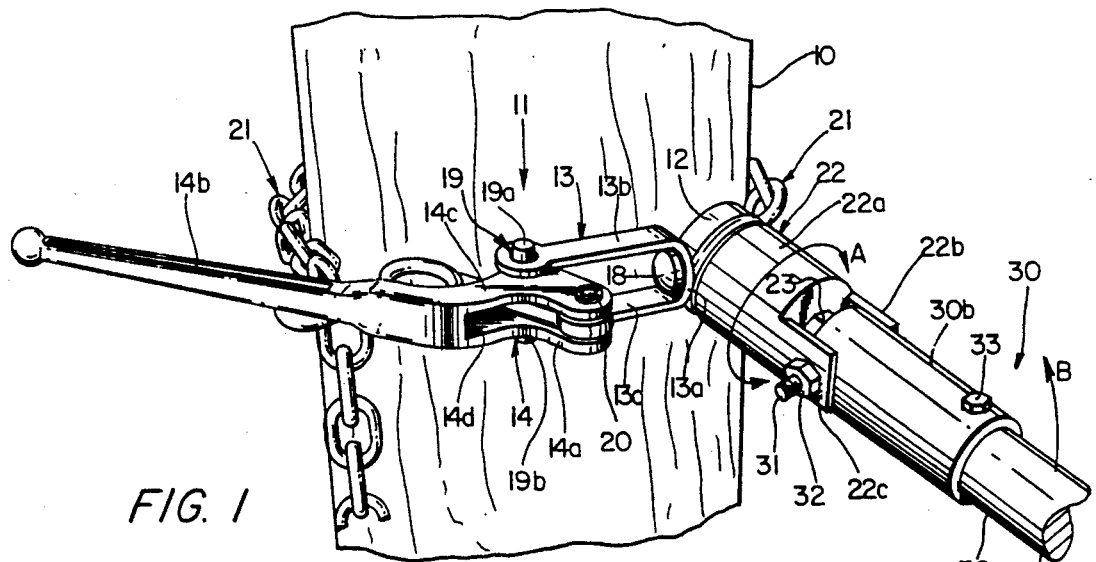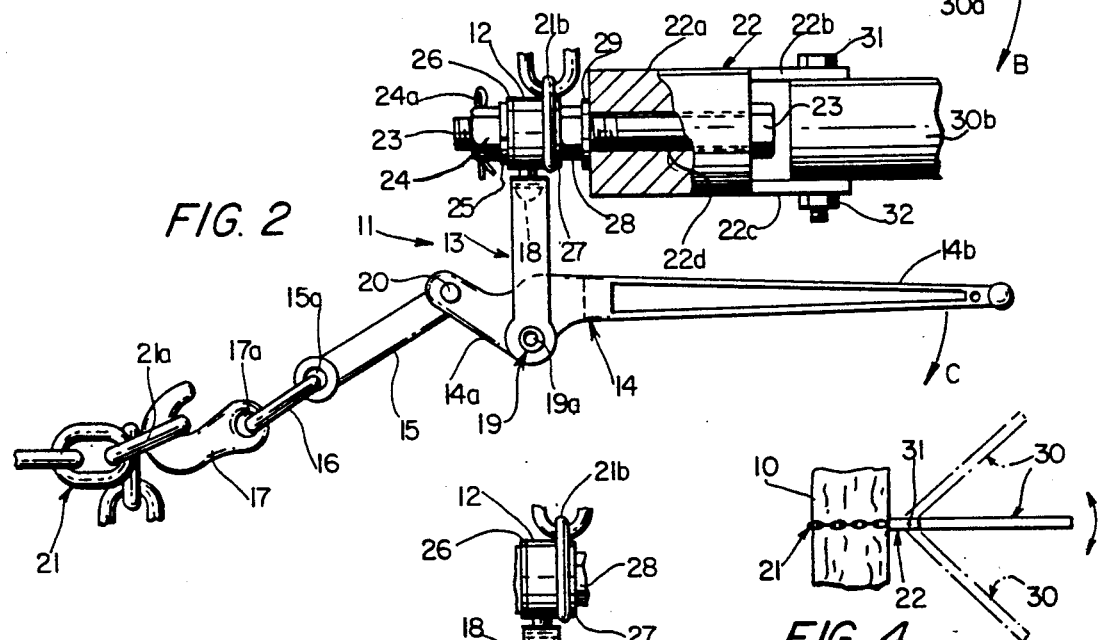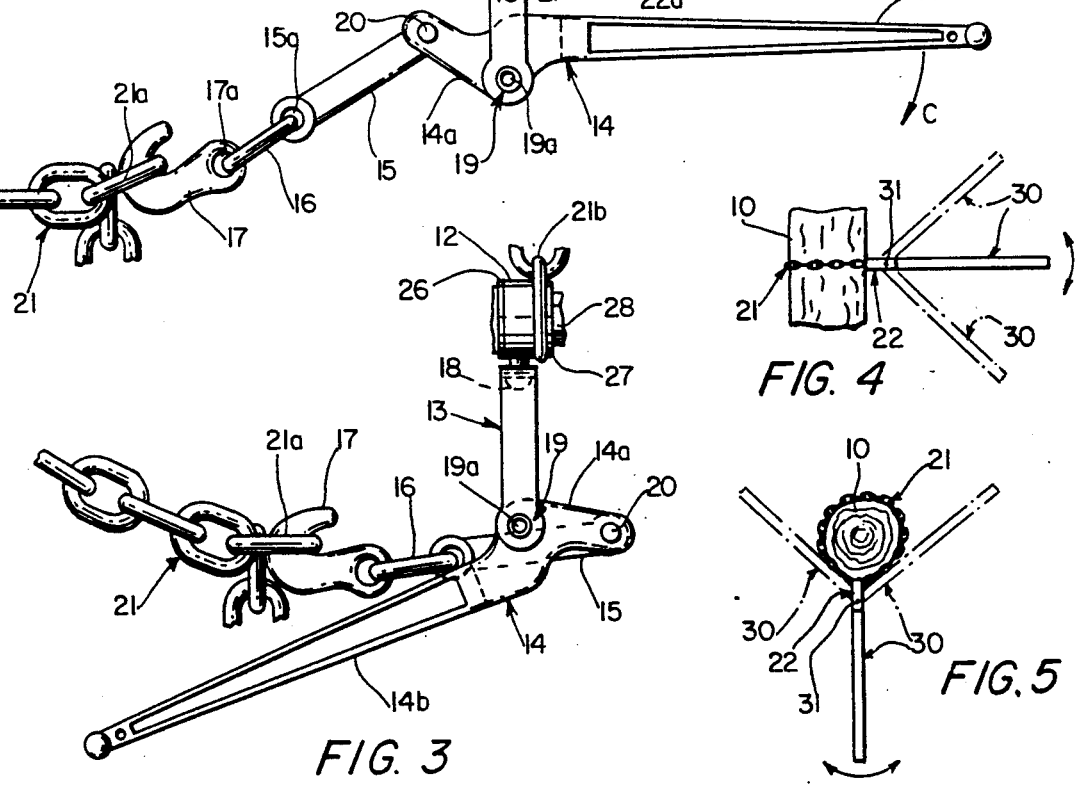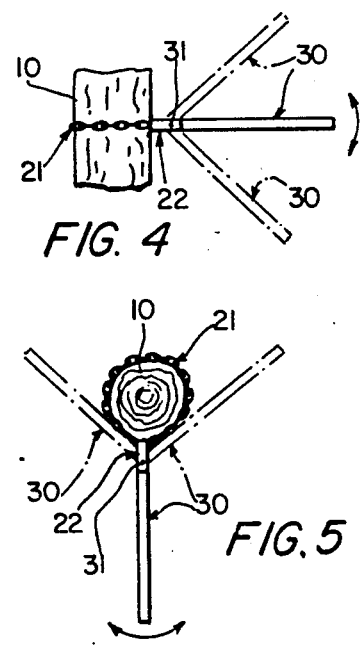

POLE HANDLER

FIELD OF THE INVENTION

The present invention generally relates to a manual tool for applying force to an elongated object such as a pole or post. In particular, the present invention comprises a tool for enabling one person to push, pull and cant a utility pole which is being set or removed from a hole.

BACKGROUND AND SUMMARY OF THE INVENTION

Manual operations involving the setting, removal and other handling of a utility pole for power and telephone lines have typically required two or more persons to apply pushing and pulling forces to the pole in the proper directions in order to maneuver the pole, for example, into or out of a hole in the ground. This is because prior art devices, such as ropes and cant hooks, are often deficient when used by only one person for this purpose. Even their use at the same time by several workmen or operators does not rectify all of the problems encountered with most prior art devices, especially when the utility pole is being manipulated in an energized power line environment. For example, operators usually cannot change their positions around the pole or release tension on ropes attached to the pole without losing positive control over the pole's movements. Moreover, control of the pole is highly dependent on the complete coordination of separate and individual actions by the operators.

The subject invention solves the aforementioned problems by providing a pole handling tool with an elongated handle that has several degrees of freedom with respect to an attached load binding mechanism. This tool can be easily secured to a pole at different heights thereon and operated by one person who can longitudinally pull and push on the handle or apply a transverse force thereto when the handle is moved to various angular positions with respect to the pole. While pole and tree handling devices are known in the prior art (e.g., see Smith U.S. Pat. No. 528,994; Shelton et al U.S. Pat. No. 951,341; Sedgwick U.S. Pat. No. 1,174,950; Shimko U.S. Pat. No. 1,805,381; and Swanson U.S. Pat. No. 4,212,577), they do not include the specific structure of the novel device described and claimed herein.

Accordingly, it is a primary object of the present invention to provide a manual pole handling tool for enabling one person or operator to push, pull or cant a pole in various directions while it is being set in or removed from a hole or otherwise being moved at a work site.

Another primary object of the present invention is to provide a manual pole handling tool whereby one person can apply force to the pole in different directions without losing positive control over the pole's movement and without needing to frequently relocate the tool on the pole.

A further object of the present invention is to provide a manual pole handling tool which can be positioned at a convenient height on the pole for enabling one person to set or assist in setting the pole completely into the bottom of a hole in the ground.

These and other objects are generally achieved in the preferred embodiment of the invention by providing a tool which comprises an insulating fiberglass rod handle that is attached to a conventional chain load binder by means of a handle sleeve and a swivel component. One end of the sleeve receives the fiberglass handle, and the sleeve's opposite end is pivotally connected at one end of the swivel so that the handle can rotate at least 180 degrees in the swivel. A bolt or other pin member connects the swivel's opposite end to the load binder so that the swivel can rotate 360 degrees. When the load binder is tightened around the pole, the swivel will permit the rod handle to rotate right, left, up or down so as to permit the application of pulling or pushing forces to the pole in various directions.

BRIEF DESCRIPTION OF DRAWINGS

FIG. 1 is a perspective view of the novel pole handler when it is secured to or grips an elongated object such as a utility pole or the like.

FIG. 2 is a plan, broken-out section view of the pole handler shown in FIG. 1 before its load binder component is operated to tighten a gripping chain around the pole.

FIG. 3 shows the pole handler of FIG. 2 after the chain tightening operation of its load binder component.

FIGS. 4 and 5 are simplified elevation and plan views, respectively, that show how the pole handler can be used by an operator to move the pole of FIG. 1.

DETAILED DESCRIPTION OF THE PREFERRED EMBODIMENT

In describing the subject invention illustrated in the drawings, specific terminology is used for the sake of clarity. However, the invention is not intended to be limited to the specific terms so selected, and each specific term includes all technically equivalent terms for components operating in a similar manner to accomplish a similar purpose.

The subject invention is a novel pole handling tool whose preferred embodiment is comprised of several major components that are shown by FIGS. 1 through 3 in connection with its use on a wooden post 10 such as a utility pole. One of these major components is a standard or conventional load binder 11 which consists of an attachment ring 12, a bent operating lever 14 with a short resistance arm 14a and a longer effort arm 14b, a U-shape bracket 13 having a center section 13a and two parallel legs 13b and 13c extending therefrom, a plate link member 15 having a hole at each end, a ring link member 16 and a hook member 17. Attachment ring 12 is loosely connected to the outside of bracket center section 13a by a swivel bolt 18 that extends from ring 12 through a hole in said bracket center section. Bracket 13 therefore can rotate around swivel bolt 18 with respect to attachment ring 12. The operating lever 14 is disposed between the outer ends of bracket legs 13b, 13c and is pivotally connected thereto by two short pins 19a and 19b which protrude outwardly from opposite sides of lever 14 and pass through holes in said bracket leg ends. These pins 19a and 19b are located at the lever's fulcrum point between the resistance arm 14a and the effort arm 14b. The longer lever effort arm 14b is of solid construction for most of its length, but is separated into two, spaced apart branch members 14c and 14d near the fulcrum pins 19a and 19b. These branch members 14c and 14d extend past the fulcrum point to become the lever's resistance arm 14a whose branch ends are each provided with a pivot hole therein. One end of plate link member 15 is pivotally connected between the spaced apart ends of lever branch members 14c, 14d by a pin 20 through the holes in these ends. The other end of plate link 15 is connected to hook member 17 by the ring link 16 which passes through respective holes 15a and 17a in the ends of plate link 15 and hook 17.

The purpose of hook 17 is to engage a link 21a in a chain 21 that is wrapped around the perimeter of pole 10 and has an end link 21b secured to attachment ring 12 by means to be described. When an operator initially fastens chain 21 to pole 10, the load binder lever 14 is first manually rotated counterclockwise to or near its position shown in FIG. 2 so that hook 17 can be moved to the left and away from bracket 13. Depending on the diameter of pole 10, an appropriate link 21a of chain 21 is then slipped over hook 17 so that chain 21 loosely fits around pole 10. Lever 14 is then rotated clockwise by the operator in the direction of arrow C to the position shown in FIG. 3 (and FIG. 1), whereby hook 17 is pulled right and moves closer to bracket 13 for tightening chain 21 around pole 10 in order to securely grip said pole. The tension force on chain 21 is applied via plate link 15 from pivot 20 on lever resistance arm 14a. When plate link 15 is moved through the spaced apart branch members 14c and 14d to the other (or outer) side of fulcrum 19 as shown in FIG. 3, the chain reaction force on arm 14a will maintain lever 14 in its FIG. 3 clockwise rotated position without need for the operator to hold it there.

As best shown in FIG. 2, the attachment ring 12 of load binder 11 is connected to one end of a swivel member 22 by a bolt and slotted nut 24. The swivel 22 can be machined from a short piece of round bar stock so that it consists of a solid core 22a from which extend a pair of spaced apart longitudinal opposing ears 22b and 22c. Alternatively, ears 22b and 22c may be welded or otherwise attached to a separate solid or hollow core 22a in order to form swivel 22. A longitudinal center hole 22d is formed in core 22a, through and from which hole the bolt 23 outwardly projects so that attachment ring 12 can be fastened thereon by nut 24, lockwasher 25 and plain washer 26. The outer end of bolt 23 has a transverse hole therein which is aligned with a transverse slot in nut 24 for allowing a cotter pin 24a to be inserted through these openings in order to maintain the position of nut 24 on bolt 23. Other types of pin elements may also be used in place of bolt 23 to pivotally connect swivel 22 to attachment ring 12.

The end link 21b of chain 21 is also slipped over bolt 23 and held thereon. Link 21b is preferably located as shown between attachment ring 12 and swivel core 22a, although link 21b could be alternatively located between ring 12 and nut 24. As shown, however, chain link 21b also is spaced from swivel core 22a by washer 27, nut 28 and washer 29. The assembly of parts on bolt 23 should be loose enough to allow swivel 22 to freely rotate 360 degrees around the axis of bolt 23 as shown by arrow A in FIG. 1. When chain 21 is tightened around pole 10, the axis of bolt 23 also will be held approximately perpendicular to pole 10 as shown in FIG. 1.

The novel pole handler further includes a relatively long handle 30 for manipulation by the operator who is using the tool. This handle 30 preferably comprises a fiber glass rod 30a which is fitted into one end of a handle sleeve 30b and secured therein by bolt or pin 33 through holes in the rod and sleeve. The length and diameter of fiber glass rod 30a depend upon the size of the pole to be handled and the electrical insulating value needed for reasons of safety. For example, a sixty foot power line pole carrying a 35 KV high voltage line will require a longer handle with greater dielectric strength than a 35 foot pole carrying a 12 KV line. For handling an average size telephone or power line pole, rod 30a may be about four feet in length and have a diameter of 1 to 2 inches. The other end of sleeve 30b fits between the ears 22b, 22c of swivel 22 and is pivotally fastened thereto by nut 32 on a transverse bolt 31 which passes through holes in this sleeve end and in the ears. As shown, bolt 31 preferably is perpendicular to the axis of swivel bolt 23. The length of ears 22b, 22c should also allow a sufficient gap between this sleeve end and the head of bolt 23 so as to permit handle 30 to rotate at least 180 degrees around bolt 31 and preferably somewhat more, so that rod 30a can be pivoted to make contact with the pole being handled as is described below in connection with FIG. 5.

The use and operation of the invention will now be described with particular reference to FIGS. 4 and 5. These are simplified elevation and plan views, respectively, that show how the handle 30 can be manually moved by an operator with respect to a generally upright pole 10 while the pole is being set into or removed from a hole in the ground or is otherwise being positioned at a work site. At the same time, however, pole 10 also may be mechanically manipulated by other means (not shown), such as a powered hoist apparatus for suspending the weight of the pole as it is being lowered or lifted. In FIGS. 4 and 5, the gripping chain 21 is assumed to be tightly fastened around pole 10 by the load binder 11 (not shown), to which swivel member 22 is connected as has been described above.

The FIG. 4 elevation view represents swivel 22 when it is in the angular orientation shown in FIG. 1, i.e., with its ears 22b, 22c lying in a generally horizontal plane so that handle 30 can be vertically rotated up and down around transverse bolt 31 as shown by arrow B. By longitudinally pulling or pushing on handle 30, the operator can respectively pull or push pole 10 toward or away from him, including canting the pole in the direction of the applied force. Furthermore, the operator can also help to control the descent or ascent of pole 10 if chain 21 has been fastened therearound at some convenient level, e.g., about knee level or above shoulder level. The two dot-dash positions of handle 30 in FIG. 4 illustrate how said handle can be rotated.

In addition, swivel 22 can be rotated either clockwise or counterclockwise from its angular position shown in FIG. 1. The FIG. 5 plan view represents swivel 22 when it is thus rotated about 90 degrees in either direction, so that ears 22b, 22c are generally vertically disposed and handle 30 can be horizontally rotated either left or right around bolt 31. If handle 30 is located at its solid line position in FIG. 5, the operator can tilt or otherwise move pole 10 toward or away from him by longitudinally pulling or pushing on the handle. When handle 30 is pivoted to either side of its said solid line position, pole 10 can also be moved in other directions or can possibly be rotated by a longitudinal force applied to the handle. If handle 30 is pivoted far enough to press against pole 10 (or against the adjacent load binder components) as shown by either of the handle's dot-dash positions in FIG. 5, a transverse force can also be applied to handle 30 by the operator, and thus to pole 10, for also moving the pole in different directions. Of course, swivel 22 can be rotated more or less than 90 degrees from its FIG. 1 position while handle 30 is pivoted in the manner shown by FIG. 5. Swivel 22 also can be rotated to either side of its FIG. 1 position while handle 30 is moved up or down as in FIG. 4.

In summary, the novel tool of the subject invention, with its swivel 22 and handle 30 combination, provides positive and convenient manual directional control by one operator of a utility pole or similar post which is being set, removed or otherwise handled at a work site.

Many modifications and variations of the present invention are possible considering the above teachings and specifications. Therefore, within the scope of the appended claims, the invention may be practiced otherwise than as specifically described above.

What is claimed is:

1. A manual tool for applying force to an elongated object with spaced-apart ends along its longitudinal axis, such as a pole, which comprises:
   (a) means for tightly gripping said object around its perimeter between the ends thereof;
   (b) swivel means pivotally connected to said gripping means so that said swivel means can rotate at least 180 degrees about an axis of said swivel means which is approximately perpendicular to the longitudinal axis of said object; and
   (c) elongated handle means pivotally connected at one end thereof to said swivel means so that said handle means can rotate at least 180 degrees about a transverse axis of said handle means, which handle axis is also transverse to and intersects said swivel means axis.

2. The tool according to claim 1, wherein said swivel means can rotate 360 degrees around its said axis.

3. The tool according to claim 1, wherein said handle means transverse axis is perpendicular to said swivel means axis.

4. The tool according to claim 3, wherein said swivel means can rotate 360 degrees around its said axis.

5. The tool according to claim 1, wherein said handle means includes a fiberglass rod.

6. A manual tool for applying force to an elongated object with spaced-apart ends along its longitudinal axis, such as a pole, which comprises:
   (a) means including a flexible binding member for tightly gripping said object completely around its perimeter between the ends thereof;
   (b) swivel means connected at one end thereof to said gripping means by a first pin means which extends longitudinally through said swivel means and transversely with respect to the longitudinal axis of said object so that said swivel means can rotate at least 90 degrees around said first pin means; and
   (c) elongated handle means connected at one end thereof to an opposite end of said swivel means by a second pin means which transversely extends through said swivel means and said handle means so that said handle means can rotate at least 180 degrees around said second pin means.

7. The tool according to claim 6, wherein said swivel means can rotate 360 degrees around said first pin means.

8. The tool according to claim 6, wherein said second pin means is perpendicular to said first pin means.

9. The tool according to claim 8, wherein said swivel means can rotate 360 degrees around said first pin means.

10. The tool according to claim 6, wherein said handle means includes a fiberglass rod.

11. The tool according to claim 6, wherein said flexible binding member comprises a chain.

12. The tool according to claim 6, wherein said swivel means opposite end is formed with a pair of spaced apart longitudinal ears between which said handle means one end is connected.

13. A manual tool for applying force to an elongated object with spaced-apart ends along its longitudinal axis, such as a pole, which comprises;
   (a) means including a flexible binding member for tightly gripping said object completely around its perimeter between the ends thereof, wherein at least part of said binding member is detachably secured to said gripping means for allowing said binding member to be wrapped around said object;
   (b) swivel means connected at one end thereof to said gripping means by a first pin means which extends longitudinally through said swivel means and transversely with respect to the longitudinal axis of said object so that said swivel means can rotate 360 degrees around said first pin means; and
   (c) elongated handle means connected at one end thereof to an opposite end of said swivel means by a second pin means which transversely extends through said swivel means and sand handle means so that said handle means can rotate more than 180 degrees around said second pin means.

14. The tool according to claim 13, wherein said first pin means is approximately perpendicular to the longitudinal axis of said object.

15. The tool according to claim 14, wherein said flexible binding member comprises a chain.

16. The tool according to claim 15, wherein said handle means includes a fiberglass rod.

* * * * *